(12) United States Patent
Gassoway et al.

(10) Patent No.: US 9,261,133 B2
(45) Date of Patent: Feb. 16, 2016

(54) MEDIA TRANSPORT ASSEMBLY SHAFT (71) Applicant: HEWLETT-PACKARD DEVELOPMENT COMPANY, L.P., Houston, TX (US)

(72) Inventors: Gabriel Michael Rask Gassoway, Bellevue, WA (US); Luke P. Sosnowski, Vancouver, WA (US); Kynan Lon Church, Vancouver, WA (US); Mike Fairchild, Vancouver, WA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 498 days.

(21) Appl. No.: 13/660,461

(22) Filed: Oct. 25, 2012

(65) Prior Publication Data

US 2014/0121086 A1    May 1, 2014

(51) Int. Cl.
F16C 13/02 (2006.01)
F16C 33/72 (2006.01)
F16C 35/02 (2006.01)
F16C 17/02 (2006.01)

(52) U.S. Cl.
CPC .............. *F16C 13/02* (2013.01); *F16C 17/02* (2013.01); *F16C 33/723* (2013.01); *F16C 35/02* (2013.01)

(58) Field of Classification Search
CPC ........ F16C 13/02; F16C 17/02; F16C 33/723; F16C 35/02; B65H 3/06; B65H 5/06; G03G 15/00; B41J 13/02; Y10T 29/49544; Y10T 29/49547; Y10T 29/49556
See application file for complete search history.

(56) References Cited

U.S. PATENT DOCUMENTS

| | | | |
|---|---|---|---|
| 3,062,533 A | 11/1962 | Eichler et al. | |
| 3,353,644 A | 11/1967 | McNash et al. | |
| 5,362,038 A | 11/1994 | Giles et al. | |
| 5,435,537 A | 7/1995 | Gysling | |
| 6,874,956 B2 * | 4/2005 | Kelley et al. | 400/59 |
| 7,753,471 B2 | 7/2010 | Waller et al. | |
| 7,950,660 B2 | 5/2011 | Takeuchi | |
| 8,210,636 B2 * | 7/2012 | Uematsu | 347/16 |
| 2009/0057996 A1 * | 3/2009 | Matsushima | 271/270 |
| 2010/0319561 A1 * | 12/2010 | Colquitt et al. | 101/477 |
| 2013/0102444 A1 * | 4/2013 | Giardino et al. | 492/15 |
| 2014/0205322 A1 * | 7/2014 | Watanabe et al. | 399/167 |

FOREIGN PATENT DOCUMENTS

| | | |
|---|---|---|
| JP | 7206187 A | 8/1995 |
| JP | 2004182369 A | 7/2004 |
| JP | 2009040512 A | 2/2009 |

OTHER PUBLICATIONS

English Machine Translation of JP2009040512A (Feb. 26, 2009).*

* cited by examiner

*Primary Examiner* — Sarang Afzali
(74) *Attorney, Agent, or Firm* — Hewlett-Packard Patent Department (57) ABSTRACT

A shaft for a media transport assembly includes a first assembly provided at a first end of the shaft to datum the shaft, and a second assembly provided at a second end of the shaft to bias the shaft in a direction opposite the second end of the shaft such that the first assembly and the second assembly each provide point contact with a respective surface oriented substantially perpendicular to an axis of the shaft.

10 Claims, 6 Drawing Sheets

MEDIA TRANSPORT ASSEMBLY SHAFT

BACKGROUND

An inkjet printing system may include a print media transport assembly which moves and/or routes print media through a print media path, and a carriage assembly which positions a printhead relative to the print media. If the print media moves in a direction transverse to that of the print direction while printing is in progress, such movement can cause an error in dot placement. In a printer with a scanning type printhead, such movement may result in a Vertical Line Straightness (VLS) error. In a printer with a fixed printhead, such as a wide array printhead assembly, such movement may result in die boundary banding. One contributor to transverse movement of the print media is paper feed shaft movement in the axial direction.

DETAILED DESCRIPTION

In the following detailed description, reference is made to the accompanying drawings which form a part hereof, and in which is shown by way of illustration specific examples in which the disclosure may be practiced. In this regard, directional terminology, such as "top," "bottom," "front," "back," "leading," "trailing," etc., is used with reference to the orientation of the Figure(s) being described. Because components of examples of the present disclosure can be positioned in a number of different orientations, the directional terminology is used for purposes of illustration and is in no way limiting. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
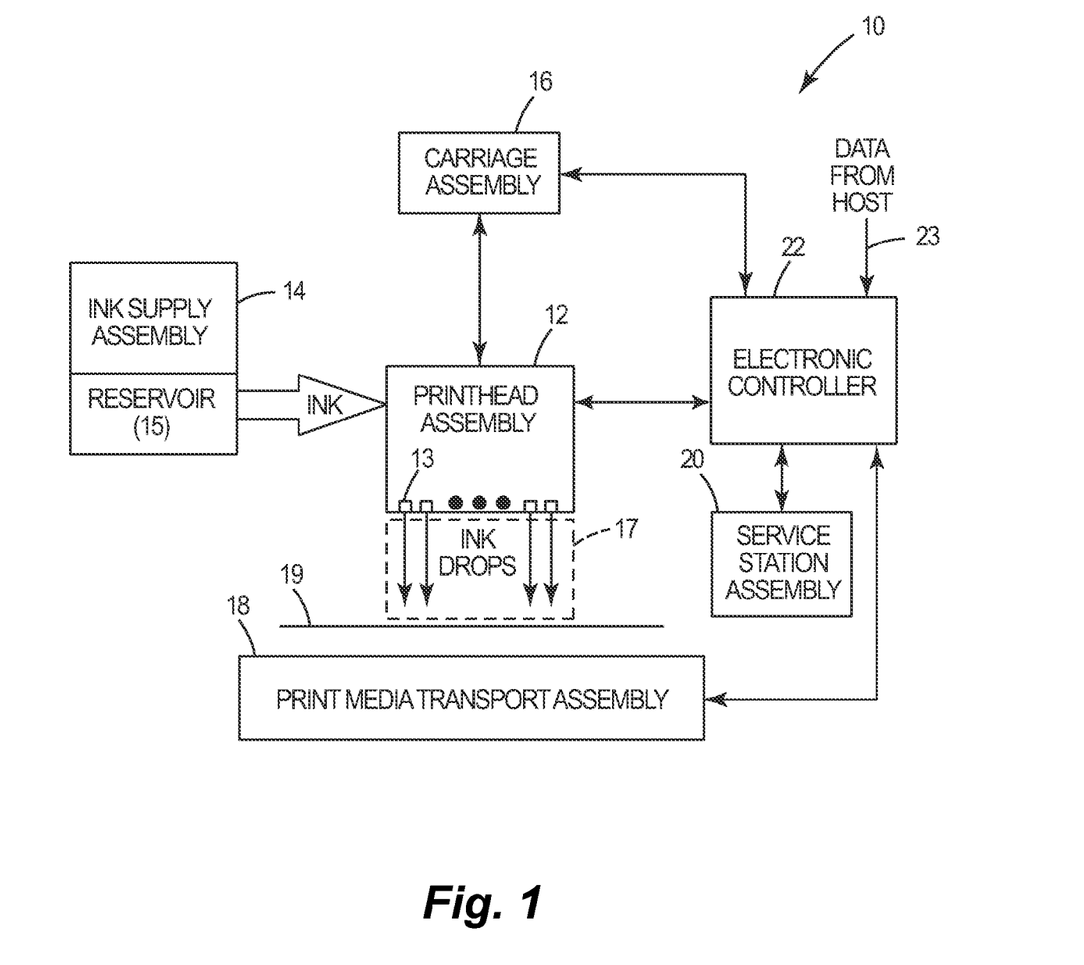
FIG. 1 is a block diagram illustrating one example of an inkjet printing system.

FIG. 1 illustrates one example of an inkjet printing system 10. Inkjet printing system 10 includes a fluid ejection assembly, such as printhead assembly 12, and a fluid supply assembly, such as ink supply assembly 14. In the illustrated example, inkjet printing system 10 also includes a carriage assembly 16, a print media transport assembly 18, a service station assembly 20, and an electronic controller 22.

Printhead assembly 12 includes one or more printheads or fluid ejection devices which eject drops of ink or fluid through a plurality of orifices or nozzles 13. In one example, the drops are directed toward a medium, such as print media 19, so as to print onto print media 19. Print media 19 includes any type of suitable sheet material, such as paper, card stock, transparencies, Mylar, fabric, and the like. Typically, nozzles 13 are arranged in one or more columns or arrays such that properly sequenced ejection of ink from nozzles 13 causes characters, symbols, and/or other graphics or images to be printed upon print media 19 as printhead assembly 12 and print media 19 are moved relative to each other.

Ink supply assembly 14 supplies ink to printhead assembly 12 and includes a reservoir 15 for storing ink. As such, in one example, ink flows from reservoir 15 to printhead assembly 12. In one example, printhead assembly 12 and ink supply assembly 14 are housed together in an inkjet or fluid-jet print cartridge or pen. In another example, ink supply assembly 14 is separate from printhead assembly 12 and supplies ink to printhead assembly 12 through an interface connection, such as a supply tube.

Carriage assembly 16 positions printhead assembly 12 relative to print media transport assembly 18 and print media transport assembly 18 positions print media 19 relative to printhead assembly 12. Thus, a print zone 17 is defined adjacent to nozzles 13 in an area between printhead assembly 12 and print media 19. In one example, printhead assembly 12 is a scanning type printhead assembly such that carriage assembly 16 moves printhead assembly 12 relative to print media transport assembly 18. In another example, printhead assembly 12 is a non-scanning type printhead assembly such that carriage assembly 16 fixes printhead assembly 12 at a prescribed position relative to print media transport assembly 18.

Service station assembly 20 provides for spitting, wiping, capping, and/or priming of printhead assembly 12 in order to maintain a functionality of printhead assembly 12 and, more specifically, nozzles 13. For example, service station assembly 20 may include a rubber blade or wiper which is periodically passed over printhead assembly 12 to wipe and clean nozzles 13 of excess ink. In addition, service station assembly 20 may include a cap which covers printhead assembly 12 to protect nozzles 13 from drying out during periods of non-use. In addition, service station assembly 20 may include a spittoon into which printhead assembly 12 ejects ink to insure that reservoir 15 maintains an appropriate level of pressure and fluidity, and insure that nozzles 13 do not clog or weep. Functions of service station assembly 20 may include relative motion between service station assembly 20 and printhead assembly 12.

Electronic controller 22 communicates with printhead assembly 12, carriage assembly 16, print media transport assembly 18, and service station assembly 20. Thus, in one example, when printhead assembly 12 is mounted in carriage assembly 16, electronic controller 22 and printhead assembly 12 communicate via carriage assembly 16.

Electronic controller 22 receives data 23 from a host system, such as a computer, and may include memory for temporarily storing data 23. Data 23 may be sent to inkjet printing system 10 along an electronic, infrared, optical or other information transfer path. Data 23 represents, for example, a document and/or file to be printed. As such, data 23 forms a print job for inkjet printing system 10 and includes one or more print job commands and/or command parameters.

In one example, electronic controller 22 provides control of printhead assembly 12 including timing control for ejection of ink drops from nozzles 13. As such, electronic controller 22 defines a pattern of ejected ink drops which form characters, symbols, and/or other graphics or images on print media 19. Timing control and, therefore, the pattern of ejected ink drops, is determined by the print job commands and/or command parameters. In one example, logic and drive circuitry forming a portion of electronic controller 22 is located on printhead assembly 12. In another example, logic and drive circuitry forming a portion of electronic controller 22 is located off printhead assembly 12.

Figure 2:
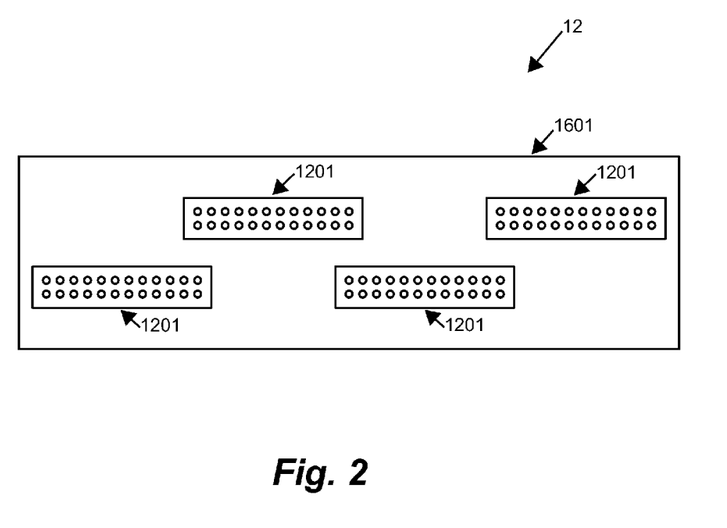
FIG. 2 is a schematic illustration of one example of a printhead assembly of an inkjet printing system.

In one example, as illustrated in FIG. 2, printhead assembly 12 is a wide-array or multi-head printhead assembly and includes a carrier 1601, as an example of carriage assembly 16, and a plurality of printhead dies 1201 mounted on carrier 1601. In one implementation, printhead dies 1201 are arranged and aligned in one or more overlapping rows (as oriented in FIG. 2) such that printhead dies 1201 in one row overlap at least one printhead die 1201 in another row. As such, printhead assembly 12 may span a nominal page width or a width shorter or longer than a nominal page width. For example, printhead assembly 12 may span 8.5 inches of a Letter size print medium or a distance greater than or less than 8.5 inches of the Letter size print medium. While four printhead dies 1201 are illustrated as being mounted on carrier 1601, the number of printhead dies 1201 mounted on carrier 1601 may vary.

In one implementation, printhead assembly 12, as a wide-array or multi-head printhead assembly including printhead dies 1201, is a non-scanning type printhead assembly such that carrier 1601 fixes printhead assembly 12 at a prescribed position relative to print media transport assembly 18 (FIG. 1). With a position of printhead assembly 12 fixed, print media 19 (FIG. 1) is moved or advanced relative to printhead assembly 12 during printing.

Figure 3:
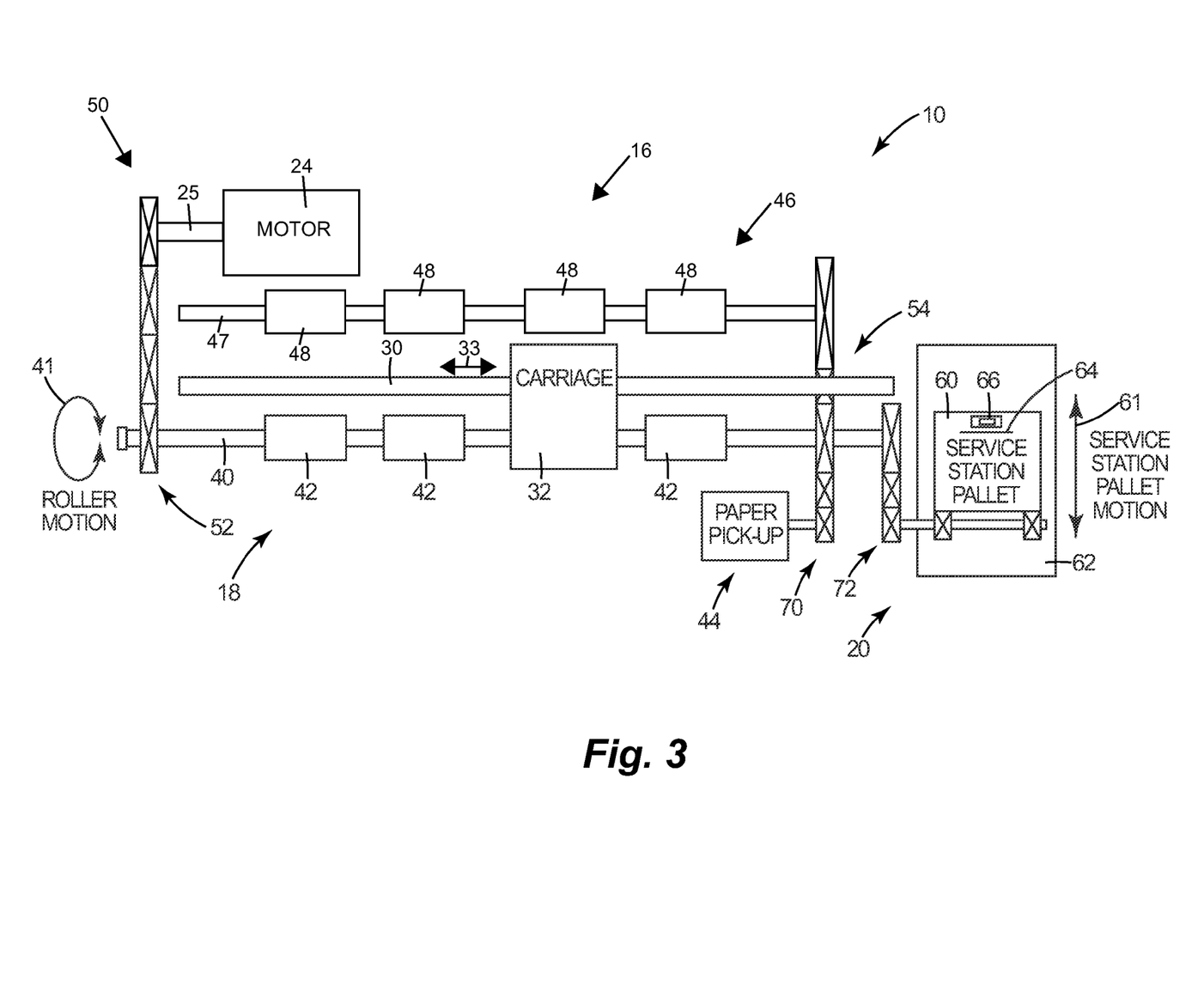
FIG. 3 is a schematic illustration of one example of a portion of an inkjet printing system.

FIG. 3 is a simplified schematic illustration of one example of a portion of inkjet printing system 10. In the example illustrated in FIG. 3, inkjet printing system 10 includes a drive motor 24 operatively coupled with print media transport assembly 18 and service station assembly 20. As such, in one implementation, motor 24 includes an output 25 which is selectively coupled with both print media transport assembly 18 and service station assembly 20.

In one example, carriage assembly 16 includes a carriage rail 30 and a carriage 32. Carriage rail 30 is mounted in a housing (not shown) of inkjet printing system 10 and provides a guide for carriage 32. Carriage 32 carries printhead assembly 12 and is slidably mounted on carriage rail 30 for lateral movement, as indicated by bi-directional arrow 33. As such, carriage 32 moves printhead assembly 12 back and forth relative to print media 19 (FIG. 1). While carriage assembly 16 is illustrated and described in association with a scanning type printhead assembly such that carriage assembly 16 moves printhead assembly 12 relative to print media transport assembly 18, carriage assembly 16 may be associated with a non-scanning type printhead assembly such that carriage assembly 16 fixes printhead assembly 12 at a prescribed position relative to print media transport assembly 18.

In one example, print media transport assembly 18 includes a drive shaft 40 and one or more drive rollers 42. Drive shaft 40 is mounted in a housing (not shown) of inkjet printing system 10 for rotational movement, as indicated by bi-directional arrow 41. Drive rollers 42 are mounted on drive shaft 40 to contact and route print media 19 through a media path of inkjet printing system 10. As such, in one implementation, drive rollers 42 advance print media 19 relative to carriage 32 in a direction substantially perpendicular to the direction of motion of carriage 32. Drive shaft 40 and drive rollers 42 constitute one example of a drive roller or drive assembly of print media transport assembly 18.

In one example, print media transport assembly 18 also includes a paper pick-up or pick assembly 44 and a feed roller or feed assembly 46. Pick assembly 44 initially engages a top sheet of print media 19 and draws print media 19 into a media path of inkjet printing system 10. As such, feed assembly 46 feeds print media 19 through the media path of inkjet printing system 10 to drive rollers 42. In one implementation, feed assembly 46 includes a feed shaft 47 and one or more feed rollers 48 mounted on feed shaft 47.

To transfer power of motor 24 to print media transport assembly 18, a power transmission arrangement 50 is interposed between motor 24 and print media transport assembly 18. In one implementation, power transmission arrangement 50 includes a gear train 52 which transfers rotational power of motor 24 to drive shaft 40 of print media transport assembly 18, and a gear train 54 which transfers rotational power of motor 24 to pick assembly 44 and/or feed assembly 46.

In one example, service station assembly 20 includes a service station sled or pallet 60 and a frame or chassis 62. In one implementation, service station pallet 60 carries one or more wipers 64 which pass over printhead assembly 12 to clean and/or remove excess ink from a face of printhead assembly 12. In one implementation, service station pallet 60 carries at least one cap 66 which covers printhead assembly 12 when not in use to prevent printhead assembly 12 from drying out. Wiping and capping of printhead assembly 12 can utilize the motion of service station assembly 20 and, more specifically, motion of service station pallet 60 relative to printhead assembly 12. As such, in one implementation, service station pallet 60 is mounted in chassis 62 for movement, as indicated by bi-directional arrow 61.

To transfer power of motor 24 to service station assembly 20, a power transmission arrangement 70 is interposed between motor 24 and service station assembly 20. In one implementation, power transmission arrangement 70 includes a gear train 72 which transfers rotational power of motor 24 to service station pallet 60.

Figure 4:
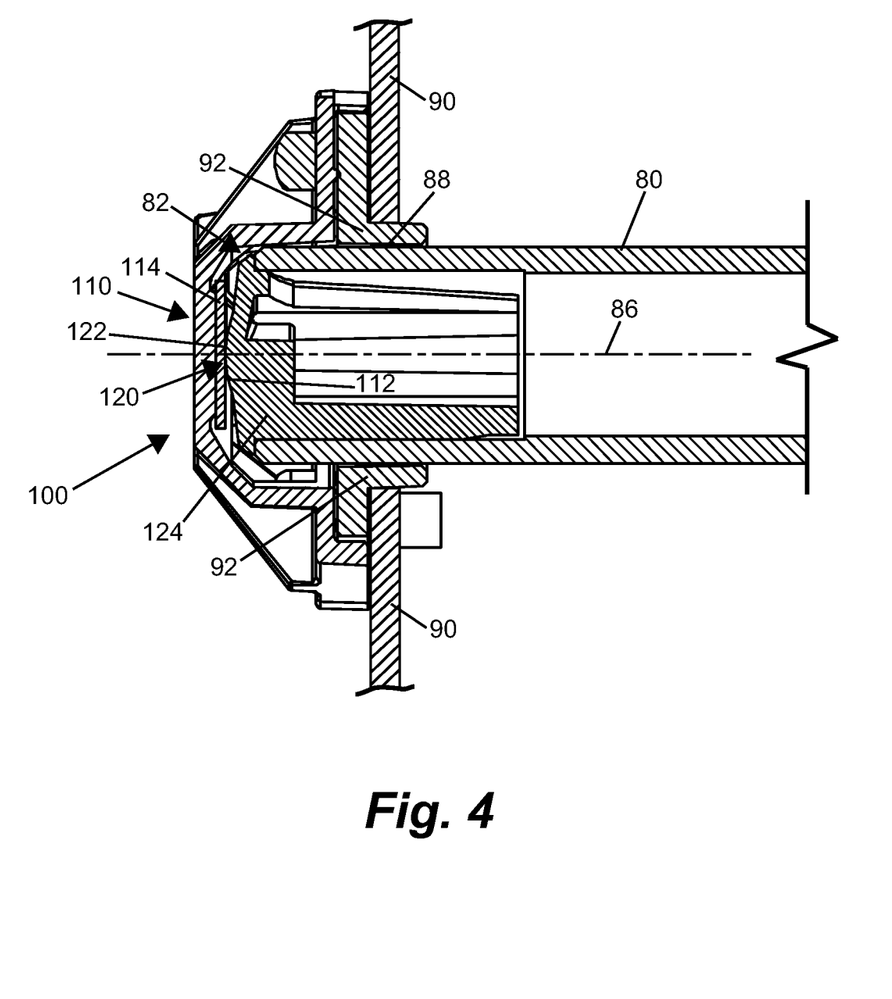
FIG. 4 is a partial cross-sectional view illustrating one example of supporting a first end of a shaft of a print media transport assembly.
Figure 5:
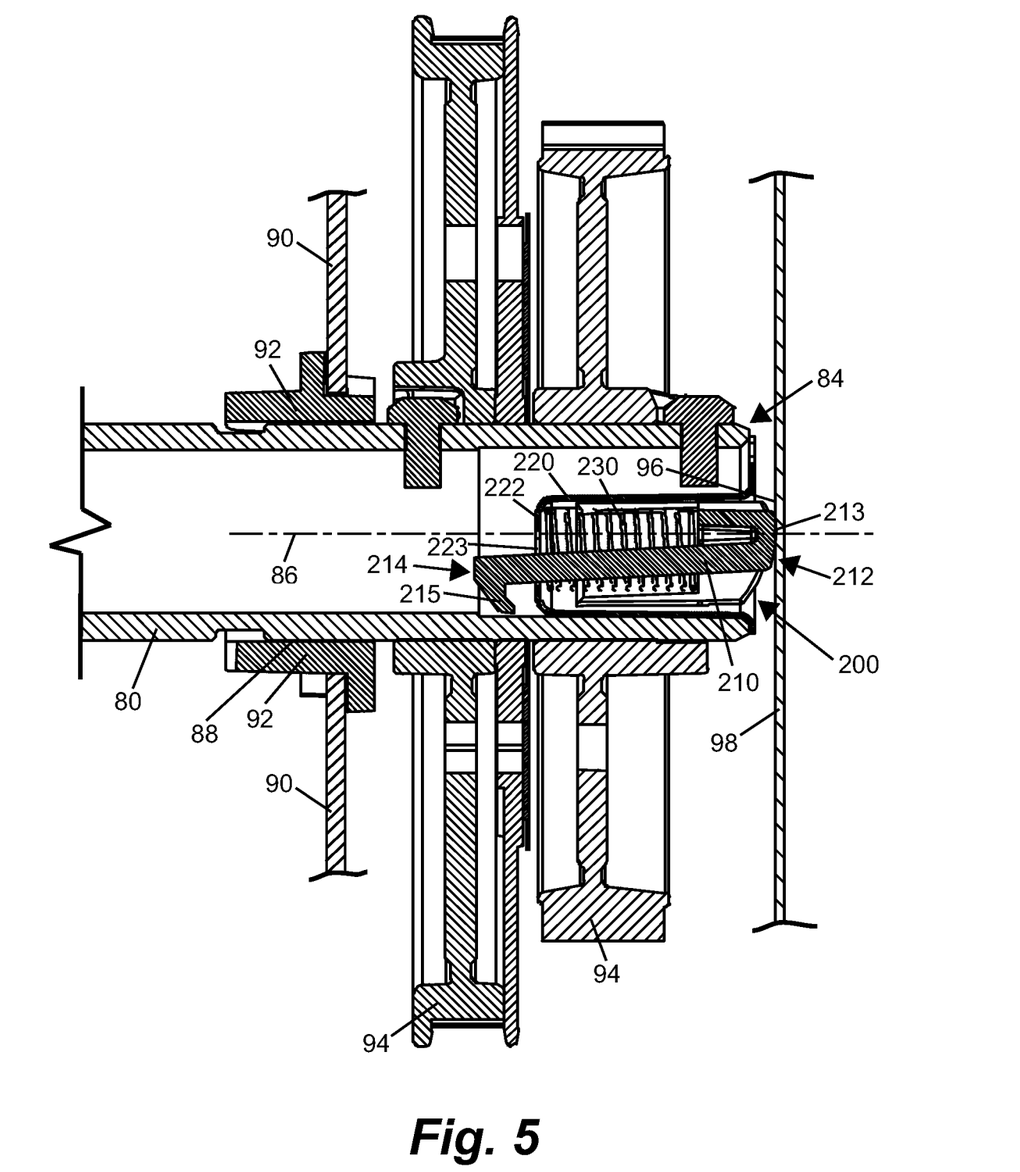
FIG. 5 is a partial cross-sectional view illustrating one example of supporting a second end of a shaft of a print media transport assembly.

FIGS. 4 and 5 illustrate one example of supporting a shaft 80 of print media transport assembly 18 within inkjet printing system 10. As described below, shaft 80 is rotatably and axially supported within a housing 90 of inkjet printing system 10. Shaft 80 is rotatably supported, for example, by one or more bearing assemblies 92 provided or mounted within housing 90, and is axially supported within housing 90 by a datuming mechanism 100 and a biasing mechanism 200, as described below. In one implementation, shaft 80 constitutes one example of feed shaft 47 of feed assembly 46.

As illustrated in the examples of FIGS. 4 and 5, shaft 80 has a first end 82 and a second end 84 opposite first end 82, and has an axis 86 extended along a length thereof between and through first end 82 and second end 84. In one implementation, first end 82 and/or second end 84 of shaft 80 support one or more pulleys, gears, wheels or other rotatable elements 94 of inkjet printing system 10. In one example, shaft 80 is formed of a hollow, cylindrical sleeve with first end 82 and second end 84 of shaft 80 both being open. As such, shaft 80 constitutes a tubular shaft.

In one example, as further described below, datuming mechanism 100 is provided at first end 82 of shaft 80 for positioning shaft 80 in an axial direction, and biasing mechanism 200 is provided at second end 84 of shaft 80 for forcing shaft 80 in an axial direction away from second end 84 and toward first end 82. As such, datuming mechanism 100 and biasing mechanism 200 provide for axial support and positioning of shaft 80 within inkjet printing system 10.

As illustrated in the example of FIG. 4, datuming mechanism 100 includes a stop 110 positioned adjacent first end 82 of shaft 80, and a nose 120 projected from first end 82 of shaft 80 to contact stop 110. In one implementation, stop 110 includes a datum or stop surface 112 spaced or positioned outwardly from first end 82 of shaft 80 in a direction along axis 86, and nose 120 includes a contact surface 122 axially extended from first end 82 of shaft 80 to contact stop surface 112 such that axis 86 of shaft 80 extends through contact surface 122.

In one example, stop surface 112 of stop 110 is oriented substantially perpendicular to axis 86 of shaft 80, and contact surface 122 of nose 120 contacts stop surface along axis 86. As such, a contact point between stop 110 and nose 120 is provided along axis 86. More specifically, in one implementation, point contact is provided between stop surface 112 of stop 110 and contact surface 122 of nose 120 through axis 86.

In one implementation, stop 110 includes a disk 114 which provides datum or stop surface 112. Disk 114 is supported by stop 110 and is formed of a material providing desired wear (or non-wear) qualities for contact with contact surface 122 of nose 120. In one example, disk 114 is formed of stainless steel.

In one implementation, nose 120, including contact surface 122, is formed by an insert 124 positioned within first end 82 of shaft 80. More specifically, insert 124 is pressed into an inner diameter of shaft 80 at first end 82 so as to be fitted within a circumference of shaft 80. Although nose 120 is illustrated and described as being a separate insert positioned within first end 82 of shaft 80, nose 120, including contact surface 122, may be integrally formed as an end of shaft 80.

In one example, first end 82 of shaft 80 is rotatably supported by a bearing assembly 92 such that contact between bearing assembly 92 and shaft 80 is provided at a bearing surface 88 of shaft 80. As such, stop surface 112 of stop 110 and contact surface 122 of nose 120 are both positioned outwardly from bearing surface 88 in a direction along axis 86. In one example, stop 110 is secured to or mounted within housing 90 with bearing assembly 92 interposed between stop 110 and housing 90.

As illustrated in the example in FIG. 5, biasing mechanism 200 includes a resiliently-biased plunger 210 slidably positioned within and axially extended from second end 84 of shaft 80. In one implementation, plunger 210 has a first end 212 and a second end 214 such that first end 212 includes a contact surface 213 and second end 214 includes a catch 215. Contact surface 213 is axially extended from and resiliently biased outward from second end 84 of shaft 80 such that axis 86 of shaft 80 extends through contact surface 213.

In one implementation, a stop surface 96 is spaced or positioned outwardly from second end 84 of shaft 80 in a direction along axis 86. Stop surface 96 may be formed, for example, by a portion of housing 90 or a bracket 98 secured to housing 90.

In one example, stop surface 96 is orientated substantially perpendicular to axis 86 of shaft 80, and contact surface 213 of plunger 210 contacts stop surface 96 along axis 86. As such, a contact point between stop surface 96 and plunger 210 is provided along axis 86. More specifically, in one implementation, point contact is provided between stop surface 96 and contact surface 213 of plunger 210 through axis 86.

In one implementation, plunger 210 is slidably positioned within an insert 220 positioned within second end 84 of shaft 80, and a spring 230 is positioned within insert 220 between plunger 210 and an end 222 of insert 220 such that plunger 210 is spring-biased outwardly from second end 84 of shaft 80. In one example, as schematically illustrated in FIG. 5, spring 230 is a coil or helical spring. Other arrangements for biasing plunger 210, however, may be provided including, for example, other forms of springs such as a leaf spring.

In one implementation, plunger 210, insert 220, and spring 230 are assembled together such that the combined assembly is inserted into second end 84 of shaft 80. More specifically, the combined assembly of plunger 210, insert 220, and spring 230 are pressed into an inner diameter of shaft 80 at second end 84 so as to be contained within a circumference of shaft 80. As such, plunger 210, insert 220, and spring 230 are internal to shaft 80 such that force applied by biasing mechanism 200 is directed in an axial direction along axis 86 of shaft 80. In one example, second end 214 of plunger 210 extends through an opening 223 in end 222 of insert 220 such that catch 215 retains plunger 210 within insert 220, for example, before plunger 210, insert 220, and spring 230 are inserted into second end 84 of shaft 80.

In one example, second end 84 of shaft 80 is rotatably supported by a bearing assembly 92 secured to or mounted within housing 90 such that contact between bearing assembly 92 and shaft 80 is provided at a bearing surface 88 of shaft 80. As such, stop surface 96 and contact surface 213 of plunger 210 are both positioned outwardly from bearing surface 88 in a direction along axis 86 of shaft 80.

As described herein, datuming mechanism 100 and biasing mechanism 200 together provide a system for positioning shaft 80 within a housing of a printing system. More specifically, shaft 80 is biased against a hard stop of datuming mechanism 100 using a spring-loaded plunger of biasing mechanism 200. With one end of shaft 80 fitted with the spring-loaded plunger, reaction force of a bullet-nose or contact surface of the spring-loaded plunger pushing against the housing (or a bracket secured to or mounted within the housing) forces shaft 80 axially away from the housing. With an opposite end of shaft 80 provided with a bullet-nose or contact surface formed, for example, by an insert pressed into the end of shaft 80, the bullet-nose or contact surface at the opposite end of shaft 80 is forced against the hard stop (i.e., datum surface) by the reaction force of the spring-loaded plunger.

In one implementation, a spring force of the spring-loaded plunger is designed to counteract system and/or media forces which could move shaft 80 off of the datum surface. As such, the bullet-nose or contact surface of the spring-loaded plunger and the bullet-nose or contact surface at the opposite end of shaft 80 are both aligned with an axis of shaft 80 to reduce movement in the axial direction, reduce wear, and reduce added torque.

Figure 6:
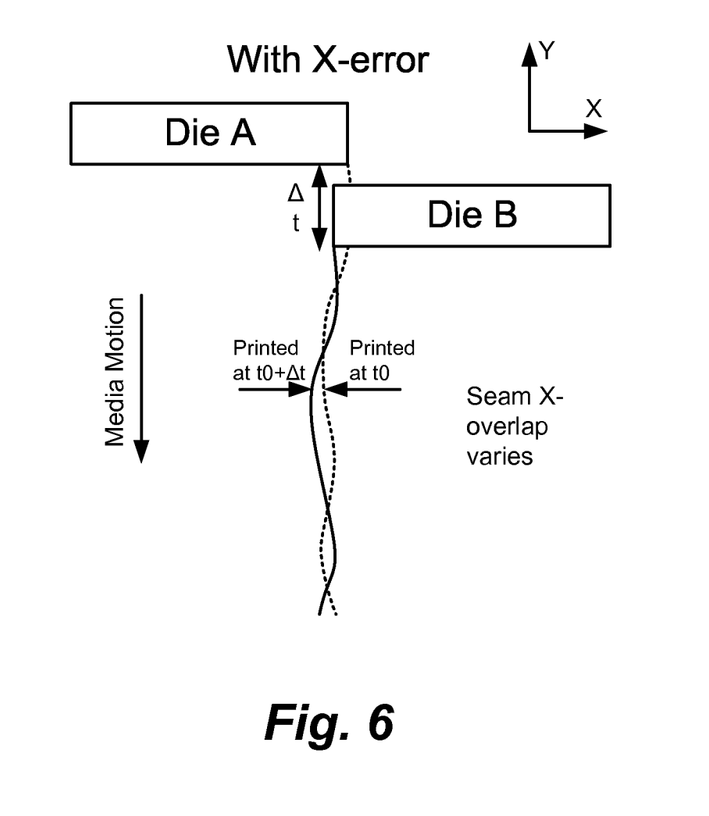
FIG. 6 is a schematic illustration of one example of printing using a print media transport assembly including a shaft without a datuming mechanism and a biasing mechanism.
Figure 7:
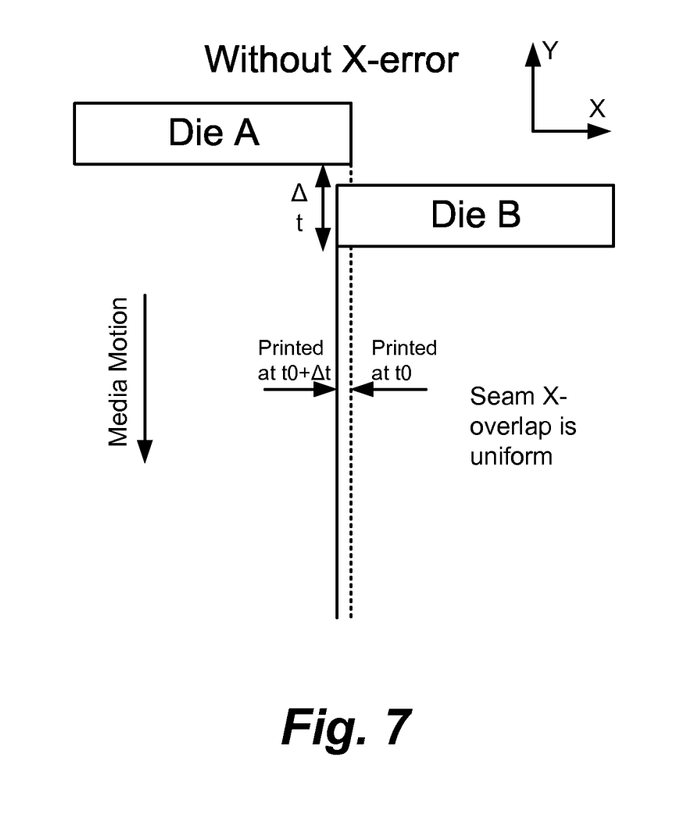
FIG. 7 is a schematic illustration of one example of printing using a print media transport assembly including a shaft with a datuming mechanism and a biasing mechanism.

FIGS. 6 and 7 schematically illustrate examples of printing using a print media transport assembly including a shaft without and with, respectively, a datuming mechanism and a biasing mechanism as described herein. FIG. 6 schematically illustrates one example of printing using a print media transport assembly including a shaft without a datuming mechanism and a biasing mechanism as described herein. As illustrated in the example of FIG. 6, with a multi-head printhead assembly including, for example, printhead dies A and B, printing using a print media transport assembly including a shaft without a datuming mechanism and a biasing mechanism as described herein, may result in feed error of media in the X-direction (i.e., perpendicular to the print direction Y) due to movement of the shaft in the axial direction. As a result, a seam of overlap at a boundary of the printhead dies may vary in the X-direction during printing ("X-error"). Variation in the seam of overlap at the boundary of the printhead dies can contribute to vertical banding which degrades image quality.

FIG. 7 schematically illustrates one example of printing using a print media transport assembly including a shaft with a datuming mechanism and a biasing mechanism as described herein. As illustrated in the example of FIG. 7, with a multi-head printhead assembly including, for example, printhead dies A and B, printing using a print media transport assembly including a shaft with a datuming mechanism and a biasing mechanism as described herein, reduces feed error of media in the X-direction (i.e., perpendicular to the print direction Y) by taking up movement of the shaft in the axial direction. As a result, a seam of overlap at a boundary of the printhead dies remains substantially uniform in the X-direction during printing, thereby reducing possible "X-error" and vertical banding.

The system provided by datuming mechanism 100 and biasing mechanism 200 for positioning shaft 80 is less susceptible to wear. For example, as the bullet-noses or contact surfaces provided at the ends of shaft 80 wear, the spring force provided by biasing mechanism 200 takes up any "slop" (i.e., movement in the axial direction) of shaft 80, thereby shifting the nominal position of shaft 80 toward the datum surface provided by datuming mechanism 100, while maintaining a minimal amount of vibration in the axial direction. As such, the spring force provided by biasing mechanism 200 takes up vibration that may be caused by shaft 80 moving axially.

The system provided by datuming mechanism 100 and biasing mechanism 200 for positioning shaft 80 is also compact in that the insert of datuming mechanism 100 and the spring-loaded plunger of biasing mechanism 200 are both contained within a circumference of shaft 80 and occupy minimal space in the axial direction beyond the ends of shaft 80. In addition, the bullet-nose designs of the insert of datuming mechanism 100 and the spring-loaded plunger of biasing mechanism 200 allow for approximate point loads of the datum surface and the surface contacted by the spring-loaded plunger thereby minimizing movement allowed or induced by the system while also minimizing an impact on an amount of torque used to rotate shaft 80. Accordingly, the system provided by datuming mechanism 100 and biasing mechanism 200 for positioning shaft 80 reduces axial movement of shaft 80 while maintaining a low profile in the axial direction and minimizing added drag to the system.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A shaft for a media transport assembly, comprising:
    a first assembly provided at a first end of the shaft to datum the shaft; and
    a second assembly provided at a second end of the shaft to resiliently bias the shaft in a direction opposite the second end of the shaft,
    the first assembly and the second assembly each to provide point contact with a respective surface oriented substantially perpendicular to a longitudinal central axis of the shaft extending from the first end to the second end,
    wherein the longitudinal central axis of the shaft extends through the point contact of each of the first assembly and the second assembly, and
    wherein the media transport assembly includes a feed assembly for feeding media through a media path of a printing system, wherein the shaft comprises a feed shaft of the feed assembly.

2. The shaft of claim 1, wherein the point contact of each the first assembly and the second assembly is positioned outwardly from a respective bearing surface of the shaft provided adjacent each of the first end and the second end of the shaft.

3. The shaft of claim 1, wherein the first assembly comprises:
    a stop surface positioned outwardly from the first end of the shaft, and
    a contact surface to contact the stop surface,
    the stop surface oriented substantially perpendicular to the longitudinal central axis of the shaft,
    the contact surface extended axially from the first end of the shaft, and
    the longitudinal central axis of the shaft extended through the contact surface.

4. The shaft of claim 1, wherein the second assembly comprises:
    a contact surface extended axially from and resiliently biased outwardly from the second end of the shaft, and
    the longitudinal central axis of the shaft extended through the contact surface.

5. A media transport assembly, comprising:
    a shaft having a first end and a second end including a longitudinal central axis extending from the first end to the second end;
    a datuming mechanism provided at the first end of the shaft for positioning the shaft in an axial direction; and
    a biasing mechanism provided at the second end of the shaft for forcing the shaft in the axial direction toward the first end,
    wherein the datuming mechanism and the biasing mechanism each provide a contact surface intersected by the longitudinal central axis of the shaft,
    wherein the datuming mechanism and the biasing mechanism each provide point contact along the longitudinal central axis of the shaft with a respective surface oriented substantially perpendicular to the longitudinal central axis of the shaft, and
    wherein the media transport assembly includes a feed assembly for feeding media through a media path of a printing system, wherein the shaft comprises a feed shaft of the feed assembly.

6. The media transport assembly of claim 5, wherein the contact surface of the datuming mechanism extends axially beyond the first end of the shaft, and the contact surface of the biasing mechanism extends axially beyond the second end of the shaft.

7. The media transport assembly of claim 5, wherein the contact surface of the datuming mechanism is positioned outwardly from a rotatably supported surface of the first end of the shaft, and the contact surface of the biasing mechanism is positioned outwardly from a rotatably supported surface of the second end of the shaft.

8. The media transport assembly of claim 5, wherein the datuming mechanism comprises:
    a stop having a datum surface oriented substantially perpendicular to the longitudinal central axis of the shaft; and
    a nose projected from the first end of the shaft to contact the datum surface of the stop, the contact surface of the datuming mechanism provided by the nose.

9. The media transport assembly of claim 5, wherein the biasing mechanism comprises:
    a plunger slidably positioned within the second end of the shaft and resiliently biased to axially extend from the second end of the shaft, the contact surface of the biasing mechanism provided by the plunger.

10. The media transport assembly of claim 5, wherein the printing system includes a non-scanning printhead assembly.

\* \* \* \* \*